United States Patent
Connolly

(10) Patent No.: US 6,374,965 B1
(45) Date of Patent: Apr. 23, 2002

(54) DAMPED BRAKE SHOE SUPPORT DEVICE FOR DRUM BRAKE ASSEMBLY

(75) Inventor: Frank Connolly, West Bloomfield, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/703,938

(22) Filed: Nov. 1, 2000

(51) Int. Cl.⁷ .......................... F16D 69/00; F16D 65/09; F16D 51/24; F16D 65/00
(52) U.S. Cl. ............................. 188/218 A; 188/250 E; 188/205 A
(58) Field of Search ...................... 188/218 A, 327–330, 188/250 A, 250 E, 250 C, 340, 106 A, 106 F, 78, 74, 205 A, 206 A, 206 R, 341, 381, 73.37

(56) References Cited

U.S. PATENT DOCUMENTS

| 4,817,765 A | * | 4/1989 | Turak et al. ............. 188/218 A |
| 4,987,979 A | * | 1/1991 | Wicks ......................... 188/340 |
| 5,099,967 A | * | 3/1992 | Lang ........................ 188/205 A |

FOREIGN PATENT DOCUMENTS

| DE | 4020539 | | 1/1991 |
| JP | 5530535 | * | 3/1980 |
| JP | 2203028 | * | 8/1990 |
| JP | 11230207 | * | 8/1999 |

OTHER PUBLICATIONS

Lucas Automotive GmbH Engineering Drawing 32190951–952–6, "Assy. Backplate", 1995.
Lucas Automotive GmbH Engineering Drawing 32190943–5, "Pin Locating", 1995.

* cited by examiner

*Primary Examiner*—Douglas C. Butler
(74) *Attorney, Agent, or Firm*—MacMillan, Sobanski & Todd, LLC

(57) ABSTRACT

An improved drum brake assembly having at least one damped brake shoe support device secured to an associated backing plate which is effective to reduce brake noise during actuation of the drum brake assembly. The drum brake assembly includes a backing plate supported relative to a vehicle component, at least one brake shoe supported on the backing plate for selective movement into frictional engagement with a brake drum, a brake mechanism for selectively moving the brake shoe into frictional engagement with the brake drum, and at least one damped brake shoe support device carried by the backing plate. The damped brake shoe support device includes a first member and a second member. The first member is formed of a relatively rigid material and includes a first end which defines a sliding surface for engagement with an adjacent surface of a brake shoe sliding surface. The second member is formed of a damping material and is interposed between the first end of the first member and the backing plate. As a result, the damped brake shoe support device of the present invention results in a reduction of brake noise generated during braking due to the vibration damping provided thereby.

16 Claims, 10 Drawing Sheets under 1. The drum brake assembly 1 includes a backing

DAMPED BRAKE SHOE SUPPORT DEVICE FOR DRUM BRAKE ASSEMBLY

BACKGROUND OF THE INVENTION

This invention relates in general to vehicle drum brake assemblies and in particular to an improved damped brake shoe support device for use in such a vehicle drum brake assembly.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies can be actuated by hydraulic, pneumatic, or mechanical pressure generated by an operator of the vehicle depressing a foot pedal, pulling a hand lever, and the like. The structure and operation of both drum brake assemblies and disc brake assemblies, as well as the actuators therefor, are well known in the art.

A typical drum brake assembly includes a backing plate which is secured to a fixed, non-rotatable component of the vehicle, such as the vehicle axle housing. A pair of opposed arcuate brake shoes are supported on the backing plate for selective movement relative thereto. Each of the brake shoes has a friction pad or lining secured thereto. The drum brake assembly further includes a hollow cylindrical brake drum which is secured to the vehicle wheel for rotation therewith. The hollow interior of the brake drum defines an inner cylindrical braking surface. The brake drum is disposed adjacent to the backing plate such that the brake shoes extend within the cylindrical braking surface. To effect braking action, the brake shoes are moved outwardly apart from one another such that the friction pads frictionally engage the cylindrical braking surface of the brake drum. Such frictional engagement causes slowing or stopping of the rotational movement of the brake drum and, therefore, the wheel of the vehicle in a controlled manner.

One or more actuating mechanisms are provided in the drum brake assembly for selectively moving the brake shoes outwardly apart from one another into frictional engagement with the cylindrical braking surface of the brake drum. Usually, a hydraulically or pneumatically actuated service brake mechanism is provided for selectively actuating the drum brake assembly under normal operating conditions. Such a service brake mechanism can include a hydraulic cylinder having a pair of opposed pistons which abut and move the brake shoes apart from one another into frictional engagement with the cylindrical braking surface of the brake drum. A mechanically actuated parking and emergency brake mechanism is also usually provided for selectively actuating the drum brake assembly. The parking and service brake mechanism can include an actuating lever pivotally supported on one of the brake shoes. The actuating lever is connected to a cable which, when pulled, moves the brake shoes apart from one another into frictional engagement with the cylindrical braking surface of the brake drum.

SUMMARY OF THE INVENTION

This invention relates to an improved drum brake assembly having at least one damped brake shoe support device secured to an associated backing plate which is effective to reduce brake noise during actuation of the drum brake assembly. The drum brake assembly includes a backing plate supported relative to a vehicle component, at least one brake shoe supported on the backing plate for selective movement into frictional engagement with a brake drum, a brake mechanism for selectively moving the brake shoe into frictional engagement with the brake drum, and at least one damped brake shoe support device carried by the backing plate. The damped brake shoe support device includes a first member and a second member. The first member is formed of a relatively rigid material and includes a first end which defines a sliding surface for engagement with an adjacent surface of a brake shoe sliding surface. The second member is formed of a damping material and is interposed between the first end of the first member and the backing plate. As a result, the damped brake shoe support device of the present invention results in a reduction of brake noise generated during braking due to the vibration damping provided thereby.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
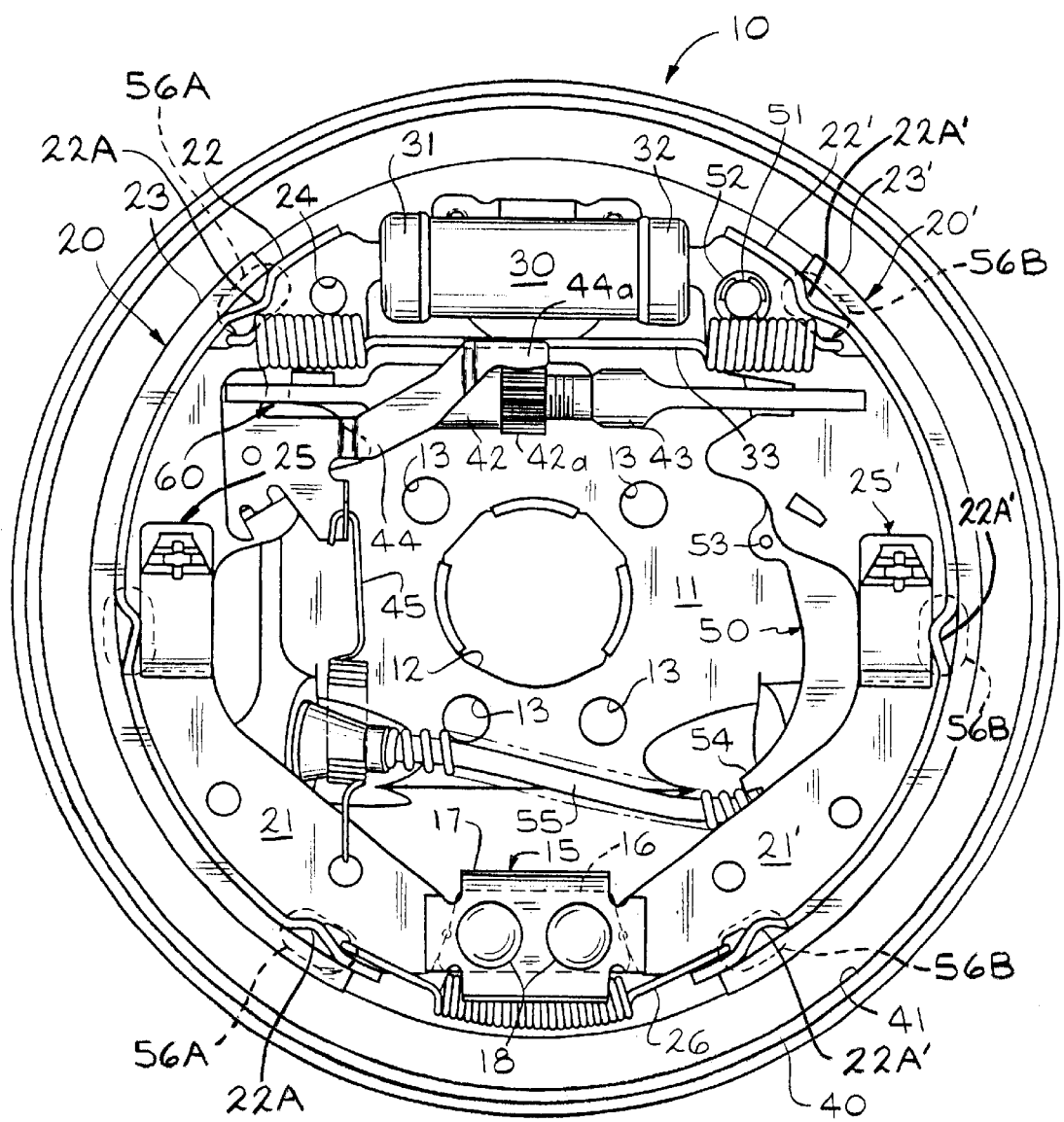
FIG. 1 is a plan view of a portion of a prior art drum brake assembly.

Referring now to the drawings, there is illustrated in FIG. 1 a portion of a prior art drum brake assembly, indicated generally at 10. The illustrated prior art drum brake assembly 10 is associated with a left rear wheel (not shown) of a vehicle. The general structure and operation of the prior art drum brake assembly 10 is conventional in the art. Thus, only those portions of the prior art drum brake assembly 10 which are necessary for a full understanding of this invention will be explained and illustrated in detail. Although this invention will be described and illustrated in conjunction with the particular vehicle prior art drum brake assembly disclosed herein, it will be appreciated that this invention may be used in conjunction with other drum and disc brake assemblies.

The illustrated prior art drum brake assembly 10 includes a rigid backing plate 11 which is generally flat and circular in shape. The backing plate 11 is adapted to be secured to a fixed, non-rotatable component of the vehicle, such as an outer end of a housing (not shown) for enclosing a rotatable axle (not shown). To accomplish this, a relatively large opening 12 is formed through the central portion of the backing plate 11. The central opening 12 is provided to permit the outer end of the rotatable axle to extend therethrough to the driven vehicle wheel (not shown). A plurality of relatively smaller holes 13 are also formed through the backing plate 12, located about the central opening 12. The smaller holes 13 are provided to permit threaded bolts (not shown) to extend therethrough to secure the backing plate 12 to the outer end of the axle.

An abutment block assembly, indicated generally at 15, is provided on the outer surface of the backing plate 11. The abutment block assembly 15 includes an inner spacer plate 16 (shown in phantom), which is disposed adjacent to the outer surface of the backing plate 11, and an outer retainer plate 17, which is disposed adjacent to the spacer plate 16. The spacer plate 16 and the retainer plate 17 are secured to the backing plate 11 by a pair of rivets 18 or similar fasteners which extend therethrough to the inner surface of the backing plate 11.

The drum brake assembly 10 further includes first and second brake shoes, indicated generally at 20 and 20'. Structurally, the brake shoes 20 and 20' are essentially mirror images of one another, and like reference numbers are used to indicate similar parts. The brake shoes 20 and 20' include respective web portions 21 and 21' which are generally flat and crescent-shaped. Arcuate table portions 22 and 22' are secured to the respective opposed outer curved surfaces of the web portions 21 and 21', such as by welding. A friction pad 23 is secured to the outer arcuate surface of the table portion 22 of the brake shoe 20, while a friction pad 23' is secured to the outer arcuate surface of the table portion 22' of the brake shoe 20'. A circular aperture 24 is formed through the upper end of the web portion 21 of the brake shoe 20, and a similar aperture (not shown) is formed through the upper end of the web portion 21 ' of the brake shoe 20' for a purpose which will be explained below. The table portion 22 of the brake shoe 20 is provided with a plurality of generally V-shaped shoe slides 22A.

In the illustrated embodiment, the brake shoe 20 includes three shoe slides 22A provided on each side of the table portion 22 (only the three shoe slides 22A on an outwardly facing side of the table portion 22 being illustrated in FIG. 1) for a purpose to be discussed below. Similarly, the brake shoe 20' includes three shoe slides 22A' provided on each side of the table portion 22' (only the three shoe slides 22A' on an outwardly facing side of the table portion 22' being illustrated in FIG. 1). The shoe slides 22A are conventional in the art and are typically formed by a stamping operation during the manufacture of the web portion 22.

The first and second brake shoes 20 and 20' are supported on the backing plate 11 by respective pivot pin and spring-clip assemblies, indicated generally at 25 and 25', which are conventional in the art. As shown by the dotted lines in FIG. 1, the lower ends of the web portions 21 and 21' of the brake shoes 20 and 20' are slightly curved. The curved lower ends of the web portions 21 and 21' are received between the backing plate 11 and the retainer plate 17 and extend into abutment with the opposed side surfaces of the spacer plate 16. A first coiled spring 26 has hooked ends which extend through respective openings formed through the lower ends of the web portions 21 and 21' so as to urge such lower ends thereof into abutment with the opposed side surfaces of the spacer plate 16.

The drum brake assembly 10 further includes service brake mechanism for actuating the drum brake assembly 10 under normal operating conditions. The service brake mechanism includes a hydraulic actuator 30 which is secured to the backing plate 11 between the upper ends of the web portions 21 and 21 ' of the brake shoes 20 and 20', respectively. The hydraulic actuator 30 includes a pair of opposed pistons 31 and 32 which respectively abut the upper ends of the web portions 21 and 21'. A second coiled spring 33 has hooked ends which extend through respective openings formed through the upper ends of the web portions 21 and 21 ' so as to urge such upper ends thereof into abutment with the pistons 31 and 32. The hydraulic actuator 30 is connected to a conventional source of pressurized hydraulic or pneumatic fluid (not shown) for operating the drum brake assembly 10.

The drum brake assembly 10 further includes a hollow cylindrical brake drum 40 which is secured to a wheel (not shown) of the vehicle for rotation therewith. The interior of the brake drum defines a cylindrical braking surface 41. When installed, the brake drum 40 is disposed adjacent to the backing plate 11 such that the brake shoes 20 and 20' extend within the cylindrical braking surface 41. To effect braking action, the brake shoes 20 and 20' are moved outwardly apart from one another so as to frictionally engage the cylindrical braking surface 41 of the brake drum 40. Such frictional engagement causes slowing or stopping of the rotational movement of the brake drum 40 and, therefore, the wheel of the vehicle in a controlled manner.

The hydraulic actuator 30 is used to operate the drum brake assembly 10 under normal service conditions. When it is desired to actuate the drum brake assembly 10, pressurized hydraulic or pneumatic fluid is supplied to the hydraulic actuator 30. Typically, this is accomplished by the operator of the vehicle depressing the brake pedal in the driver compartment of the vehicle. When such pressurized hydraulic or pneumatic fluid is supplied to the hydraulic actuator 30, the pistons 31 and 32 are moved apart from one another. As a result, the upper ends of the brake shoes 20 and 20' are also moved apart from one another, essentially pivoting about the abutment block assembly 15. This movement causes the friction pads 23 and 23' to move into frictional engagement with the cylindrical braking surface 41 of the brake drum 40. The abutment block assembly 15 functions to transfer the braking torque from the leading brake shoe (i.e., the left brake shoe 20 when the brake drum 40 is rotating in a counter-clockwise direction) to the frame of the vehicle. When the brake shoes 20 and 20' are moved apart from one another, the second coiled spring 33 is expanded. Thus, when the pressurized hydraulic or pneumatic fluid to the hydraulic actuator 30 is subsequently released, the second coiled spring 33 retracts the brake shoes 20 and 20' inwardly toward one another and out of frictional engagement with the cylindrical braking surface 41 of the brake drum 40.

The drum brake assembly 10 also includes an automatic adjusting mechanism to compensate for thinning of the friction pads 23 and 23' resulting from wear caused by repeated use. The illustrated automatic adjusting mechanism is conventional in the art and includes a pair of mutually threaded struts 42 and 43 having opposed slotted ends. The upper ends of the web portions 21 and 21' of the brake shoes 20 and 20', respectively, are received within the slotted ends of the struts 42 and 43. A star wheel portion 42a is formed integrally on the strut 42. An adjuster lever 44 is pivotally mounted on the web portion 21 of the brake shoe 20. The adjuster lever 44 has a protruding arm portion 44a which extends into cooperation with the star wheel portion 42a of the strut 42. A third coiled spring 45 has hooked ends which extend through respective openings formed through the adjuster lever 44 and the lower end of the web portion 21 so as to urge the protruding arm portion 44a of the adjuster lever 44 into engagement with the star wheel portion 42a of the strut 42.

As is known, when the brake shoes 20 and 20' are moved outwardly apart from one another such that the friction pads 23 and 23', respectively, frictionally engage the cylindrical braking surface 41 of the brake drum 40, the adjusting lever 44 is pivoted. When a sufficient amount of wear has occurred on the friction pads 23 and 23', the adjusting lever 44 will be pivoted a sufficient amount so as to rotate the star wheel portion 42a and the strut 42 relative to the strut 43. Such relative rotation causes the opposed ends of the struts 42 and 43 to be moved slightly farther apart from one another, together with the associated upper ends of the brake shoes 20 and 20'. Thus, the automatic adjusting mechanism functions to maintain a predetermined clearance A, shown in FIGS. 8 and 9, between the friction pads 23 and 23' of the brake shoes 20 and 20', respectively, and the cylindrical braking surface 41 of the brake drum 40 as wear occurs during operation of the drum brake assembly 10.

In addition to the service brake mechanism described above, the drum brake assembly 10 of this invention further includes a mechanically actuated parking and emergency brake mechanism. The parking and emergency brake mechanism includes an actuating lever, indicated generally at 50. The actuating lever 50 is pivotally supported on the web 21' of brake shoe 20 by a pivot pin assembly which includes a pivot pin 51 having an enlarged head and a reduced diameter body. The body of the pivot pin 51 is inserted through respective aligned apertures formed through the actuating lever 50 and the web portion 21' of the brake shoe 20'. An E-clip 52 is then installed in a groove formed about the end of the body of the pivot pin 51 to retain it in the apertures such that the actuating lever 50 is pivotally supported on the brake shoe 20'. The actuating lever 50 further includes an upstanding pin 53, and a hooked lower end portion 54. The hooked end portion 54 facilitates the connection of one end of an actuating cable 55 thereto. The actuating cable 55 is conventional in the art and is connected to a hand operated lever (not shown) or similar manually operable parking and emergency brake mechanism for selectively actuating the drum brake assembly 10.

Figure 2:
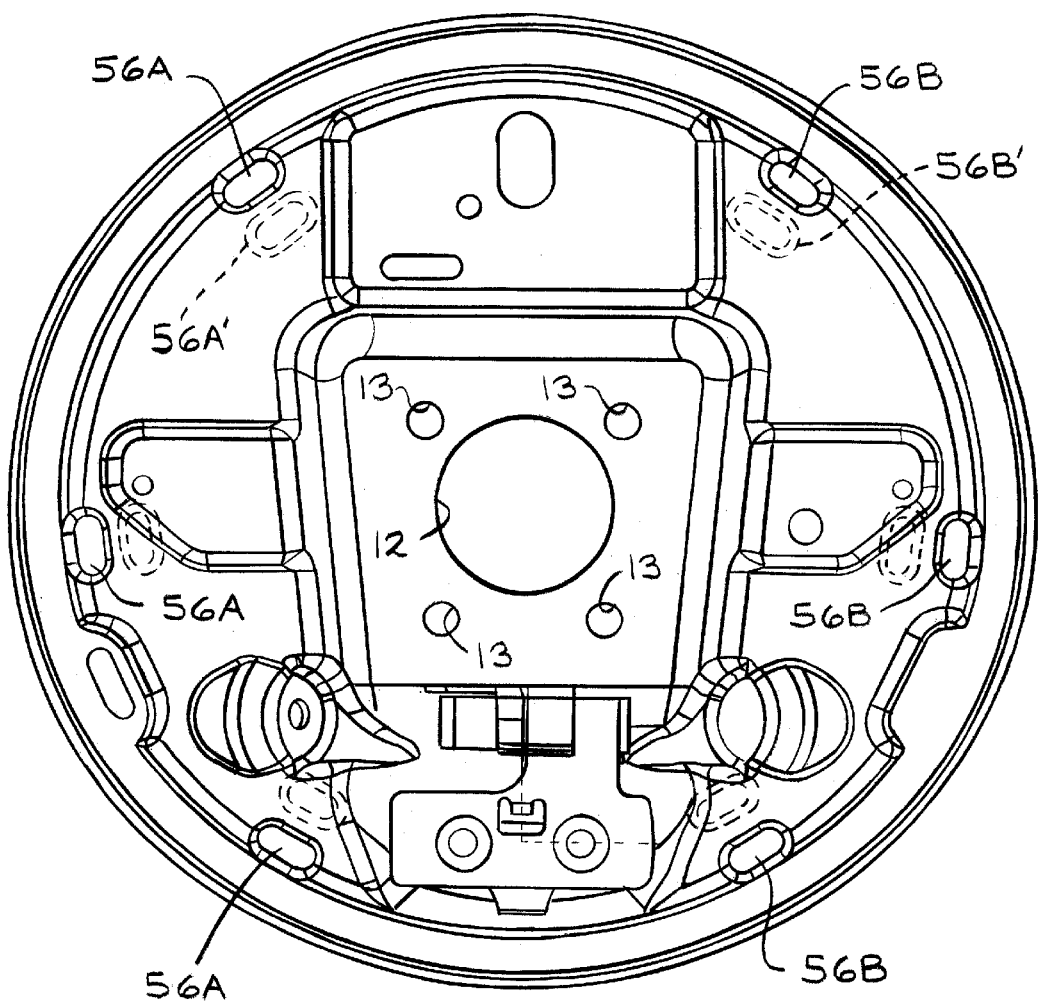
FIG. 2 is a plan view of a prior art backing plate shown in the prior art drum brake assembly of FIG. 1.

As best shown in prior art FIG. 2, the prior art backing plate 11 includes a plurality of raised shoe pad rests 56A and 56B provided thereon (the shoe pad rests 56A and 56 also shown in phantom in FIG. 1). In the illustrated embodiment, the backing plate 11 includes three raised shoe pad rests 56A provided on the right side thereof, and three shoe pad rests 56B provided on the left side thereof. The shoe pad rests 56A and 56B are conventional in the art and are typically embossed shoe rest pads formed by a stamping operation during the manufacture of the backing plate 11. As will be discussed below, the shoes pad rests 56A and 56B define a sliding surface for the associated V-shaped portions 22A and 22A of the table portions 22 and 22' of the respective brake shoes 20 and 20' in a known "table guided shoe" drum brake assembly during actuation of the drum brake assembly 10.

As is known in the art, when the brake shoes 20 and 20' are supported on the backing plate 11, the shoe slides 22A of the brake shoe 20 are disposed adjacent and in contact with the shoe pad rests 56A, and the shoe slides 22A' of the brake shoe 20' are disposed adjacent and in contact with the shoe pad rests 56B. Thus, when the drum brake assembly 10 is actuated causing movement of the brake shoes 20 and 20' relative to the backing plate 11, the brake shoes slides 22A of the brake shoe 20 move relative to the shoe pad rests 56A and the brake shoe slides 22A' move relative to the shoe pad rests 56B. Alternatively, as shown in phantom in FIG. 2, the backing plate 11 can include three raised shoe pad rests 56A' provided on the right side thereof, and three shoe pad rests 56B' provided on the left side thereof. The shoe pad rests 56A' and 56B' are conventional in the art and are typically embossed shoe rest pads formed by a stamping operation during the manufacture of the backing plate 11. The shoes pad rests 56A' and 56B' define a sliding surface for the associated web portions 21 and 21' of the respective brake shoes 20 and 20' in a known "web guided shoe" drum brake assembly. The construction of the drum brake assembly 10 thus far described is conventional in the art.

Figure 3:
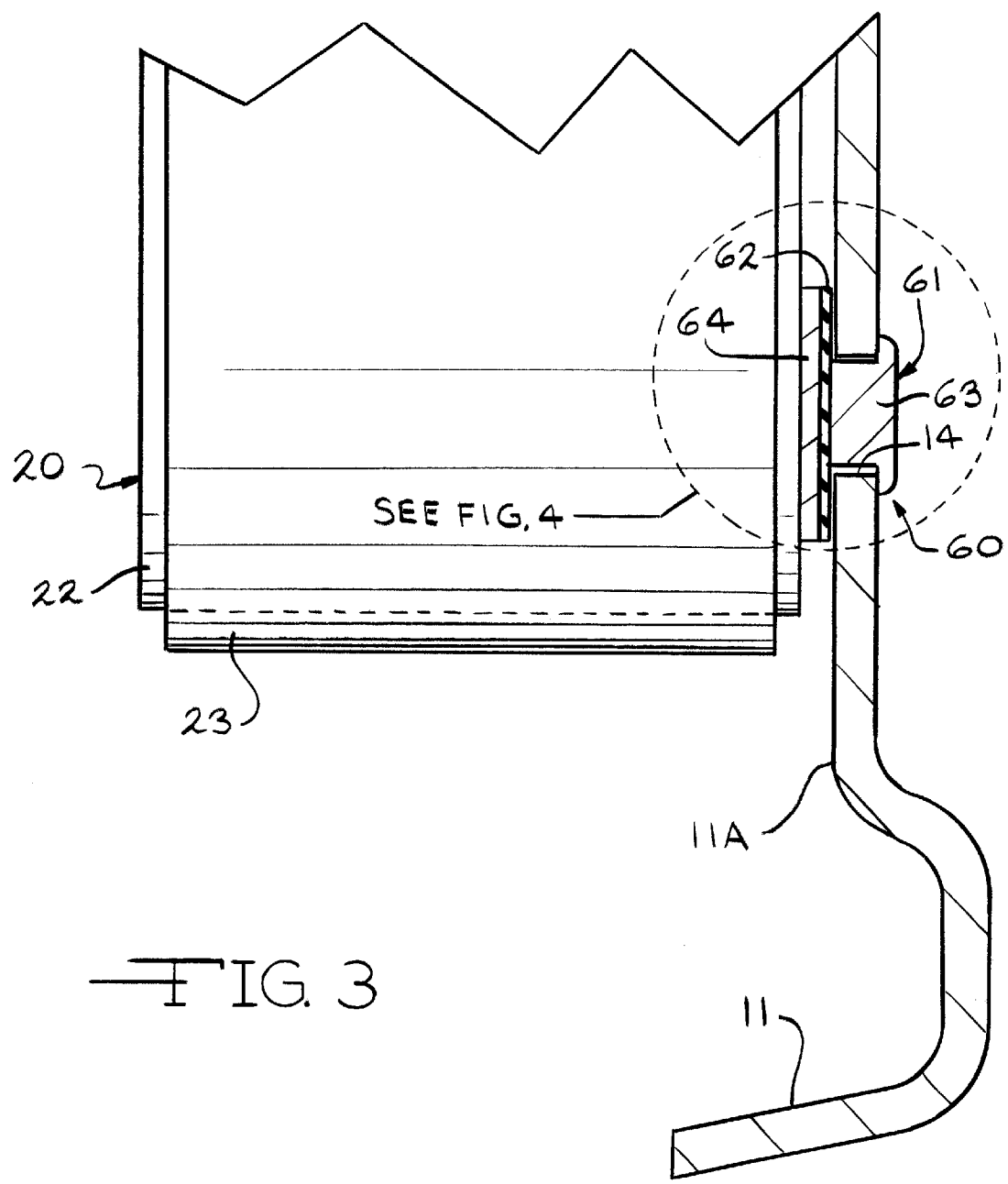
FIG. 3 is an enlarged sectional view of a portion of a drum brake assembly including a first embodiment of a damped brake shoe support device in accordance with the present invention.
Figure 4:
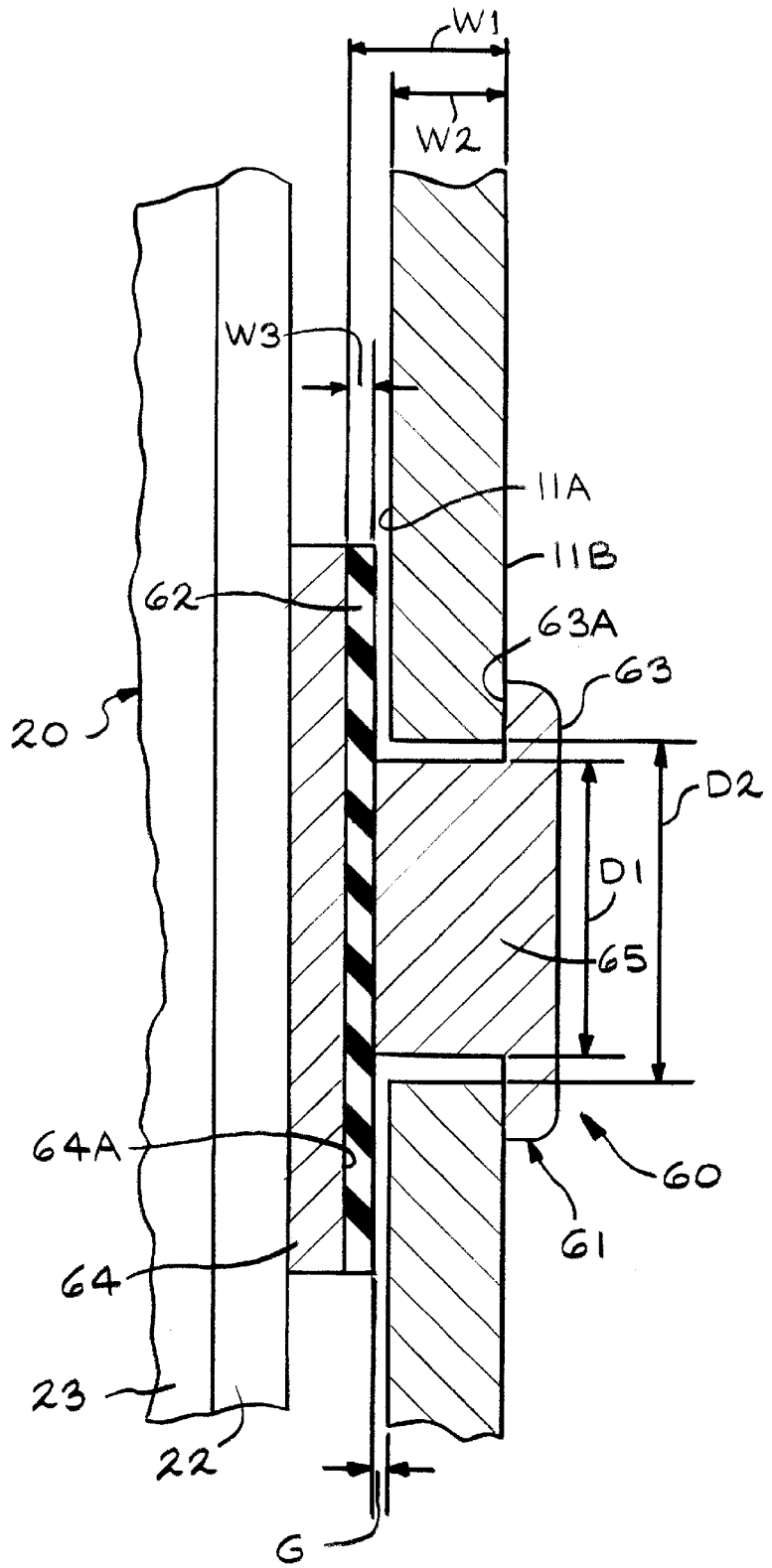
FIG. 4 is an enlarged sectional view of a portion of the damped brake shoe support device shown in FIG. 3.

Turning now to FIGS. 3 and 4 and using like reference numbers to indicate corresponding parts, the structure of a first embodiment of a damped brake shoe support device, indicated generally at 60, in accordance with the present invention will be discussed. The damped brake shoe support device 60 includes a fastener 61 and a damping member 62. In the illustrated embodiment, the fastener 61 is shown as being a rivet which is installed in an opening 14 provided in the backing plate 11. The rivet 61 includes a generally flat head or first end 63, an opposed generally flat plain or second end 64, and a main body portion 65 extending therebetween. As shown in FIGS. 3 and 4, the damping material 62 is interposed between an inner surface 64A of the plain end 64 of the rivet 61, and an outer side 11A of the backing plate 11. A suitable material for the fastener 61 is any relatively hard rigid material which provides a suitable sliding surface for the associated table portion 22 of the brake shoe 20 in the illustrated "table guided shoe" drum brake assembly 10. Alternatively, the fastener 61 could provide a sliding surface for the associated web portion 21 of the brake shoe 20 in a "web guided shoe" drum brake assembly. Examples of suitable materials for the fastener 61 can include steel, alloys, castings, and plastics. A suitable material for the damping material 62 is any elastomeric material, such as for example, rubber, EPDM rubber, or Santoprene® manufactured by Advanced Elastomer Systems of Akron, Ohio.

Preferably, the rivet 61 is installed in the opening 14 of the backing plate 11 with "free play" movement in an axial direction, a radial direction, or both an w axial and radial direction relative to the backing plate 11 so as to prevent or damp vibration of the brake shoe and the transmission of vibration from the brake shoes 20 and 20' to the backing plate 14 or the transmission of vibration from the backing plate 14 to the brake shoes 20 and 20'. To accomplish the radial free play movement, an outer diameter D1 of the body portion 65 of the rivet 61 is slightly less than a diameter D2 defined by the opening 11 to allow for axial movement of the damped brake shoe device 60 relative to the backing plate 11

(the dimensions for D1 and D2 being shown exaggerated in FIGS. 3 and 4 for clarity purposes). To allow for axial movement of the installed damped brake shoe device 60 relative to the backing plate 11, an axial length W1 defined between the inner surface 64A of the plain end 64 and an inner surface 63A of the head 63 of the rivet 63 is greater than the combined thicknesses of a thickness W2 of the backing plate 11 and a thickness W3 of the damping material 62 to thereby define a free play gap G between the damped brake shoe device 60 and the backing plate 11. In FIGS. 3 and 4, the gap G is shown as being between an inner surface 62A of the damping material 62 and the outer side 11A of the backing plate 11. However, it is understood that since the damped brake shoe device 60 is free to "float" in the axial direction relative to the backing plate 11, a gap (not shown) could be defined between the inner surface 63A of the head 63 of the rivet and an inner side 11B of the backing plate 11, or gaps could be defined on opposite sides of the backing plate 11 between an associated outer side 11A thereof and the inner surface 62A of the damping material 62, and between an associate inner side 11B thereof and the outer side 11A of the backing plate 11. Alternatively, the damped brake shoe device 60 could be fixedly installed in the opening 14 of the backing plate 11 so that no movement of the device 60 relative to the backing plate 11 could occur in either the axial or radial directions.

Preferably, the backing plate 11 is provided with six openings 14 formed therein and a damped brake shoe device 60 is installed in each of such openings to replace, and therefore, eliminate all six of the shoe pad rests 56A and 56B (or the shoe pad rests 56A' and 56B'). Each of the openings 14 is located approximately at the location of each of the shoe pad rests 56A and 56B. Alternatively, a combination of one or more damped brake shoe devices 60 and shoe pad rests 56A and 56B (and/or shoe pad rests 56A' and 56B') can be used. For example, the left side of the backing plate 11 could include one damped brake shoe device 60 and two shoe pad rests 56A (and/or 56A'), and the right side of the backing plate could include one damped brake shoe device 60 and two shoe pad rests 56B (and/or 56B'). If this is the case, the damped brake shoe device 60 is preferably located intermediate the associated shoe pad rests 56A and 56B (and/or 56A' and 56B').

Figure 5:
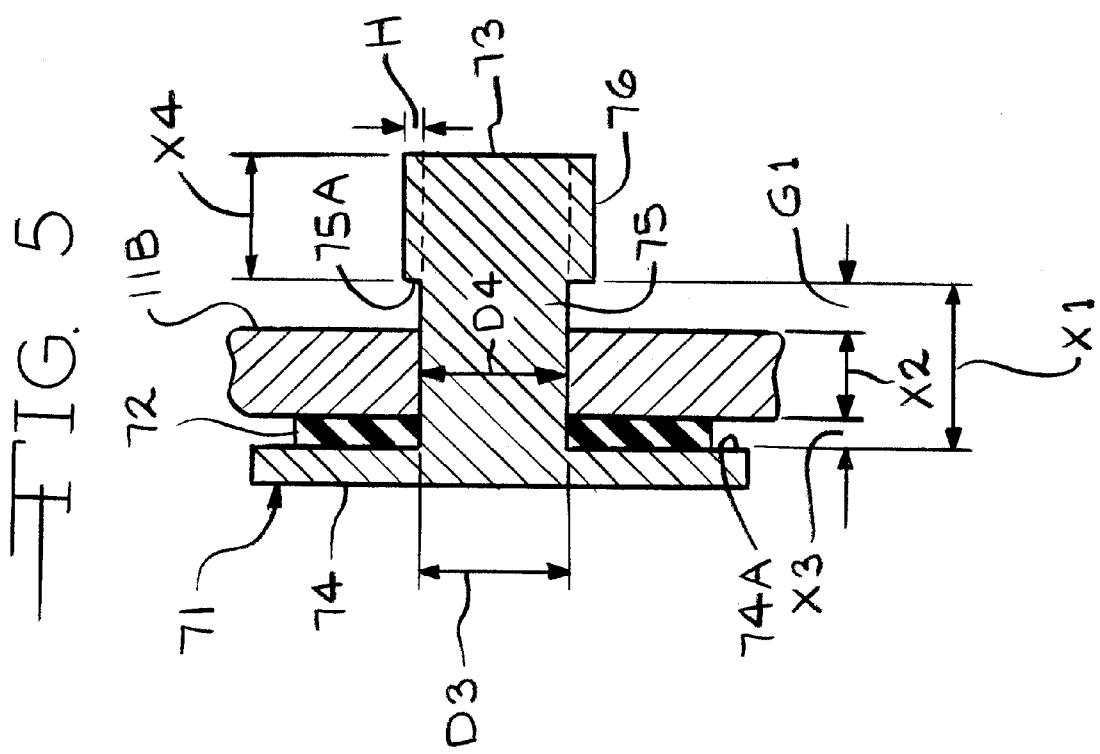
FIG. 5 is a sectional view of a portion of a drum brake assembly including a second embodiment of a damped brake shoe support device in accordance with the present invention.

Turning now to FIGS. 5–8 and using like reference numbers to indicate corresponding parts, the structure of a second embodiment of a damped brake shoe support device, indicated generally at 70 in FIG. 5, in accordance with the present invention will be discussed. The damped brake shoe support device 70 includes a fastener 71 and a damping member 72. In the illustrated embodiment, the fastener 71 is shown as being installed in an opening 14 provided in the backing plate 11. The fastener 71 includes a first end 73, and an opposed second end 74, and a main body portion 75 extending therebetween. As shown in FIG. 5, the damping material 72 is interposed between an inner surface 74A of the second end 74 of the fastener 71, and an outer side 11A of the backing plate 11. A suitable material for the fastener 71 is any relatively hard rigid material which provides a suitable sliding surface for associated table portion(s) and/or web portion(s) of the respective brake shoes. Examples of such suitable materials can include steel, alloys, castings, and plastics. A suitable material for the damping material 72 is any elastomeric material, such as for example, rubber, EPDM rubber, or Santoprene® manufactured by Advanced Elastomer Systems of Akron, Ohio.

As shown in the embodiment illustrated FIGS. 5–8, the fastener 71 includes a plurality of raised ribs or protuberances 76 formed an outer surface adjacent the first end 73 thereof. In the illustrated embodiment, the fastener 71 includes four ribs 76 equally spaced about the body 75. The ribs 76 have a generally round profile and extend an axial distance X4 defined between a shoulder 75A and the first end 73. The ribs 76 define a radius R which in turn defines a height H extending outwardly from the diameter D3 of the main body 75 of the fastener 71. Alternatively, the profile, number, and/or orientation of the ribs 76 can be other than illustrated if so desired. Also, the fastener 71 could include other surface profiles for securing it to the backing plate 11. For example, an outer surface of the fastener could be provided with a knurled outer surface (not shown) for frictionally retaining it in the opening 11.

In the illustrated embodiment, the fastener 71 is preferably installed in the opening 14 of the backing plate 11 with "free play" movement in an axial direction relative thereto. To accomplish, an axial length X1 defined between the inner surface 74A of the second end 74 and an associated shoulder 75A of the fastener 71 is greater than the combined thicknesses of a thickness X2 of the backing plate 11 and a thickness X3 of the damping material 72 to thereby define a free play gap G1 between the damped brake shoe device 70 and the backing plate 1. In FIG. 5, the gap G1 is shown as being between an inner side 11B of the backing plate 11 and the shoulder 75A of the fastener 75. However, it is understood that since the damped brake shoe device 70 is free to "float" in the axial direction relative to the backing plate 11, a gap or gaps could be defined between an associated side of the backing plate 11 and an adjacent surface or surfaces of the damped brake shoe device 70. As shown in FIG. 5, the main body portion 75 of the fastener 71 defines an outer diameter D3 which is slightly less than a diameter D4 defined by the opening 14 so as to be snugly received within the opening 14 without substantial looseness or free play therebetween. Alternatively, the damped brake shoe device 70 could be fixedly installed in the opening 14 of the backing plate 11 so that no movement of the device 60 relative to the backing plate 11 could occur in the axial, or could be installed in the opening 14 of the backing plate 11 so that only movement in the radial direction can occur.

Preferably, the backing plate 11 is provided with six openings 14 formed therein and a damped brake shoe device 70 is installed in each of such openings to replace, and therefore, eliminate all six of the shoe pad rests 56A and 56B (and/or shoe pad rests 56A' and 56B'). Each of the openings 14 is located approximately at the location of each of the shoe pad rests 56A and 56B. Alternatively, a combination of one or more damped brake shoe devices 70 and shoe pad rests 56A and 56B (and/or shoe pad rests 56A' and 56B') can be used. For example, the left side of the backing plate 11 could include one damped brake shoe device 70 and two shoe pad rests 56A, and the right side of the backing plate could include one damped brake shoe device 70 and two shoe pad rests 56B. If this is the case, the damped brake shoe device 70 is preferably located intermediate the associated shoe pad rests 56A and 56B.

Figure 6:
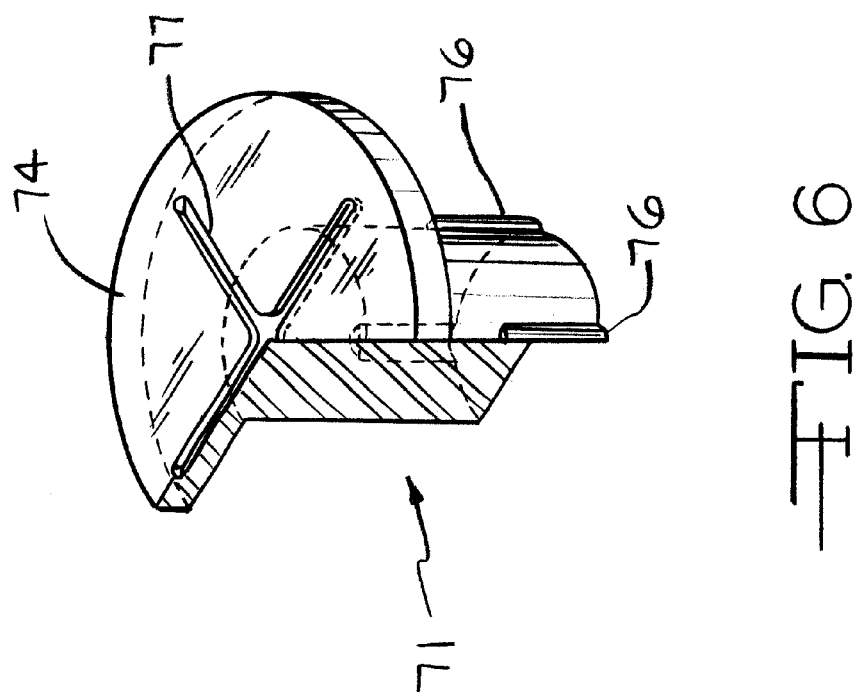
FIG. 6 is a perspective view of the fastener of the damped brake shoe support device shown in FIG. 5.
Figure 7:
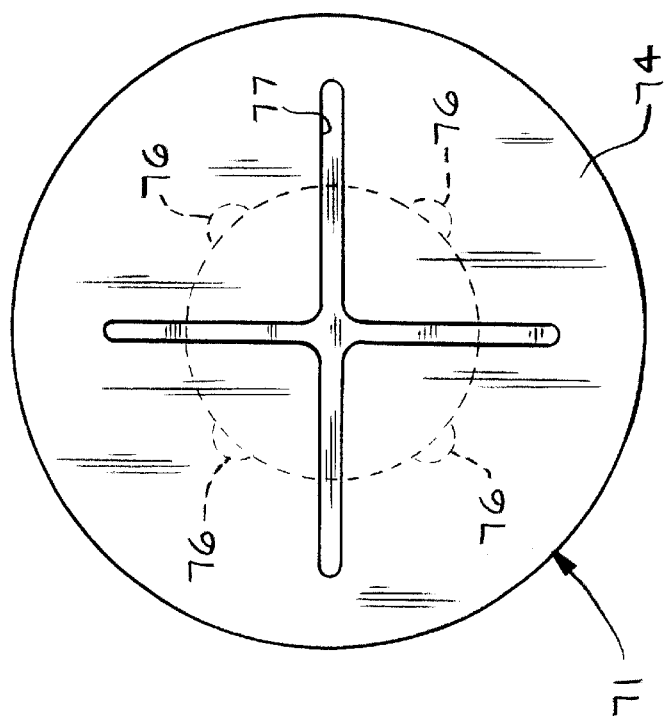
FIG. 7 is another view the fastener of the damped brake shoe support device shown in FIG. 5.
Figure 8:
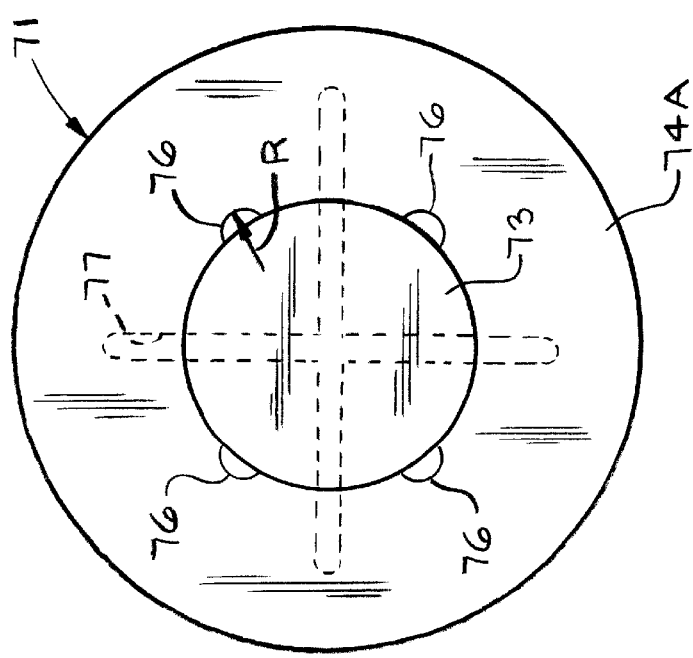
FIG. 8 is another view the fastener of the damped brake shoe support device shown in FIG. 5.

In order to install the damped brake shoe device 70 in a respective opening 70, the damping material 72 is first installed on the body portion 75 of the fastener 71. To accomplish this, the damping member is positioned adjacent the first end 73 and then forcibly installed over the ribs 76 causing it to deform as it moves over the ribs 76 until it moves past the shoulder 75A onto the body portion having the diameter D3 whereby it returns to its original shape. Next, the first end 73 of the fastener 71 is positioned adjacent the opening 14 of the backing plate 11 and the second end fastener 74 is hit or struck with a suitable device so as to drive or force the first end 73 through the opening 14 (to the right in FIG. 5), whereby the ribs 76 deform the material of the backing plate 11 as it is driven through the opening 14. To accomplish this, the material of the ribs 76, and therefore the fastener 71, is preferably harder than the material of the backing plate 11. The fastener 71 continues to be driven through the opening 14 until the shoulder 75A clears the inner side 11B of the backing plate 11. As shown in FIGS. 6–8, the fastener 71 preferably further includes a cavity or recess 77 provided in the second end 74 thereof. The cavity 77 is filled with grease so as to provide a lubricated sliding surface for the associated web portions 21 and 21' and/or table portions 22 and 22' of the respective brake shoes 20 and 20'. Alternatively, in order to assist in the installation of the fastener 71 in the opening 14, the fastener 71 could include one or more axially extending slots formed therein (not shown), to allow the end 73 to partially collapse or deflect inwardly during the installation thereof so that the ribs 76 can more easily pass through the opening 14.

Figure 9:
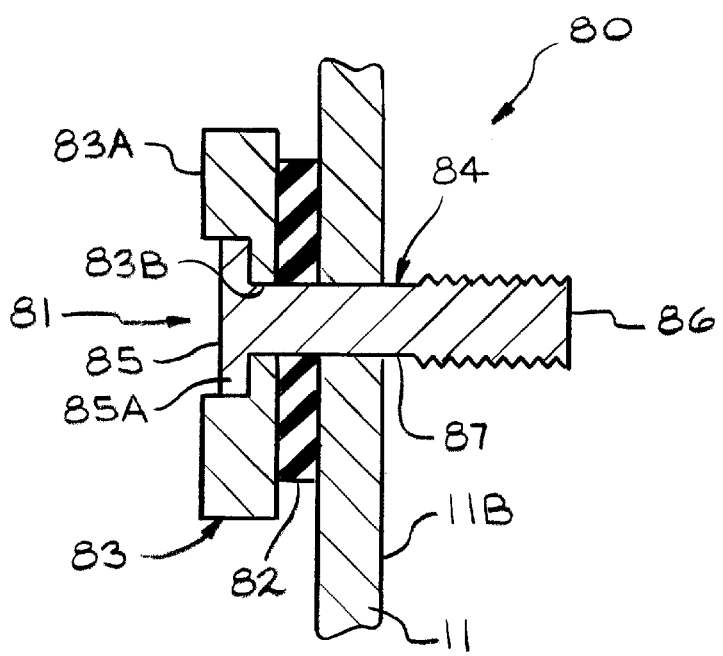
FIG. 9 is a sectional view of a portion of a drum brake assembly including a third embodiment of a damped brake shoe support device in accordance with the present invention.

Turning now to FIG. 9 and using like reference numbers to indicate corresponding parts, the structure of a third embodiment of a damped brake shoe support device, indicated generally at 80, in accordance with the present invention will be discussed. The damped brake shoe support device 80 includes a composite fastener 81 and a damping member 82. In the illustrated embodiment, the composite fastener 81 is shown as being installed in an opening 14 provided in the backing plate 11. The composite fastener 81 includes a first member 83 and a second member 84. The first member 83 includes a generally flat outer surface 83A which is adapted to define a brake shoe web sliding surface (or brake shoe table sling surface). The first member 83 further includes countersunk opening 83B. The second member 84 includes a first end 85, an opposed second end 86, and a main body portion 87 extending therebetween. The first end 85 includes an enlarged head 85A which is adapted to be received in the countersunk portion of the opening 83B. The main body portion 87 of the second member 84 is provided with serrations in a "Christmas tree pattern" along a portion thereof extending from the second end 86 toward the first end 85. A suitable material for the first member 83 is any relatively hard rigid material which provides a suitable sliding surface for associated web portion(s) and/ or table portion(s) of the respective associated brake shoes. Examples of such suitable materials can include steel, alloys, castings, and plastics. A suitable material for the second member 84 is any elastomeric material, such as for example, rubber, EPDM rubber, or Santoprene® manufactured by Advanced Elastomer Systems of Akron, Ohio.

In order to install the damped brake shoe device 80 in a respective opening 14, the second member 84 is forcibly inserted through the opening 83B of the first member 83, and then the damping material 72 is forcibly installed on the body portion 87 of the second member 84. Next, the second end 86 of the fastener 81 is positioned adjacent the opening 14 of the backing plate 11 and a force is applied to the first end 85 so as to deflect or deform the serrations of the christmas tree end of the second member 84 as the composite fastener 81 is advanced through the opening 14 (to the right in FIG. 9). The composite fastener 81 continues to be advanced through the opening 14 until a last one of the serrations clear an inner side 11B of the backing plate 11. Preferably, as shown in this embodiment, axial free play exists between the device 80 and the backing plate 11 when the device 80 is in its installed position.

Figure 10:
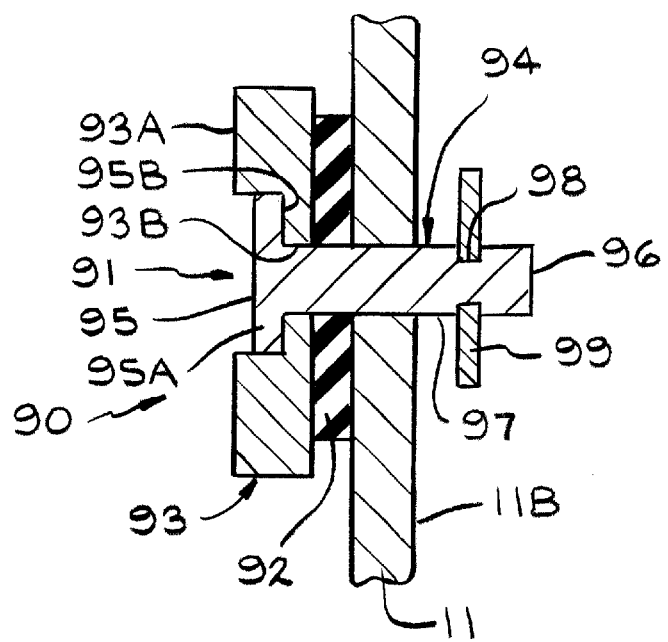
FIG. 10 is a sectional view of a portion of a drum brake assembly including a fourth embodiment of a damped brake shoe support device in accordance with the present invention.
Figure 11:
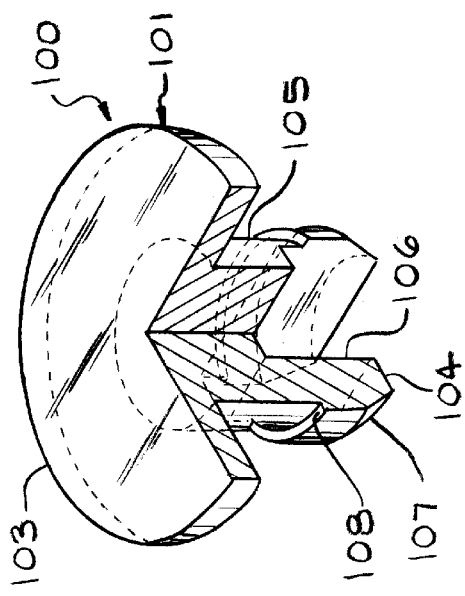
FIG. 11 is a perspective view of a fifth embodiment of a portion of a damped brake shoe support device in accordance with the present invention.
Figure 14:
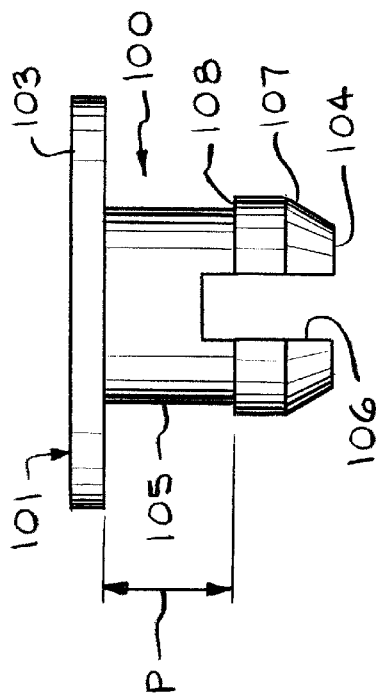
FIG. 14 is another view the damped brake shoe support device shown in FIG. 11.
Figure 12:
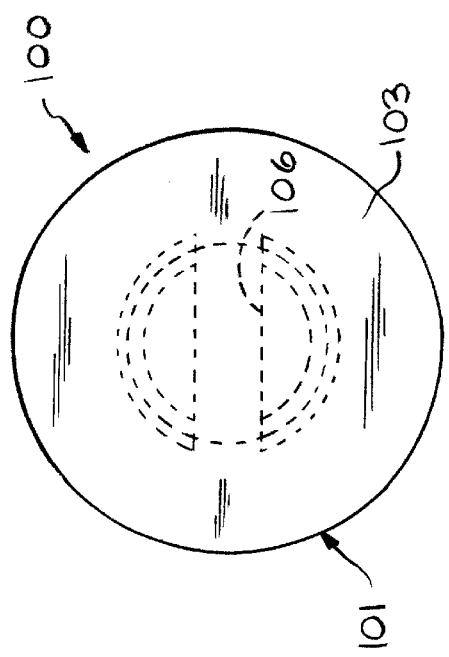
FIG. 12 is another view of the damped brake shoe support device shown in FIG. 11.
Figure 13:
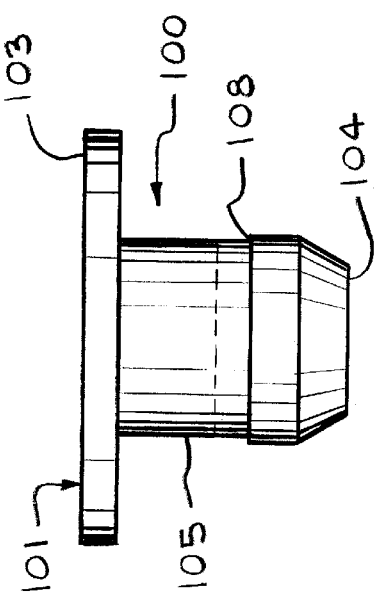
FIG. 13 is another view the damped brake shoe support device shown in FIG. 11.

Turning now to FIG. 10 and using like reference numbers to indicate corresponding parts, the structure of a fourth embodiment of a damped brake shoe support device, indicated generally at 90, in accordance with the present invention will be discussed. The damped brake shoe support device 90 includes a composite fastener 91 and a damping member 92. In the illustrated embodiment, the composite fastener 91 is shown as being installed in an opening 14 provided in the backing plate 11. The composite fastener 91 includes a first member 93 and a second member 94. The first member 93 includes a generally flat outer surface 93A which is adapted to define a brake shoe web sliding surface (or a brake shoe table sliding surface). The first member 93 further includes countersunk opening 93B. The second member 94 includes a first end 95, an opposed second end 96, and a main body portion 97 extending therebetween. The first end 95 includes an enlarged head 95A which is adapted to be received in the countersunk portion of the opening 93B. The main body portion 97 of the second member 94 is provided with an annular groove 98 formed therein. A suitable material for the first member 93 is any relatively hard rigid material which provides a suitable sliding surface for the associated web portion(s) and/or table portion(s) of the respective brake shoes. Examples of such suitable materials can include steel, alloys, castings, and plastics. A suitable material for the second member 94 is any elastomeric material, such as for example, rubber, EPDM rubber, or Santoprene® manufactured by Advanced Elastomer Systems of Akron, Ohio.

In order to install the damped brake shoe device 90 in a respective opening 14, the second member 94 is inserted through the opening 93B of the first member 93, and then the damping material 92 is installed on the body portion 97 of the second member 94. Next, the second end 96 of the fastener 91 is positioned adjacent the opening 14 of the backing plate 11 and is advanced through the opening 14 (to the right in FIG. 10). The composite fastener 81 continues to be advanced through the opening 14 until the groove 98 clears an inner side 11B of the backing plate 11. Then, a suitable fastener, such as an Eclip 99, in installed in the groove 98 to thereby secure the damped brake shoe device 90 to the backing plate 11. Preferably, as shown in this embodiment, axial free play exists between the device 90 and the backing plate 11 when the device 90 is in its installed position. Alternatively, other types of fasteners can be used to secure the device 90 to the backing plate 11. For example, a wavy or spring washer (not shown) or a cotter pin (not shown) could be provided for securing the device to the backing plate 11. If such fasteners are used, they would still preferably allow free play in the axial direction.

Turning now to FIGS. 11–14 and using like reference numbers to indicate corresponding parts, the structure of a portion of a fifth embodiment of a damped brake shoe support device, indicated generally at 100, in accordance with the present invention will be discussed. The damped brake shoe support device 100 includes a fastener 101 and a damping member (not shown). The fastener 100 is adapted to be installed in an opening provided in the backing plate.

The fastener 101 includes a first end 103, and an opposed second end 104, and a main body portion 105 extending therebetween. A suitable material for the fastener 101 is any relatively hard rigid material which provides a suitable sliding surface for the associated web portion(s) and/or table portion(s) of the respective brake shoes. Examples of such suitable materials can include steel, alloys, castings, and plastics.

The fastener 101 includes a slot 106 formed therein extending from the second end 104 toward the first end 103. Also, the body 105 includes a tapered portion 107 adjacent the second end 104, and a shoulder 108 formed thereon. Preferably, the fastener 101 is installed in the opening of the backing plate with "free play" movement in an axial direction relative thereto. To accomplish, an axial length P defined between the inner surface 103A of the first end 103 and the shoulder 108 of the fastener 101 is greater than the combined thicknesses of a thickness of the backing plate and a thickness of the damping material to thereby define a free play gap (not shown) between the damped brake shoe device 100 and the associated backing plate. Alternatively, the damped brake shoe device 100 could be fixedly installed in the opening of the backing plate so that no movement of the device relative to the backing plate could occur in the axial, or could be installed in the opening of the backing plate so that only movement in the radial direction can occur. In order to install the damped brake shoe device 100 in a respective backing plate opening, the damping material is first installed on the body portion of the fastener. Next, the end 104 of the fastener 101 is positioned adjacent the opening of the backing plate and the fastener end 103 is hit, struck, or pushed with a suitable device so as to drive or force the end 104 through the opening whereby the slot 106 is operative to allow the end 104 to partially collapse or deflect inwardly during the installation thereof as it is moved through the opening 14. The fastener 101 continues to be moved through the opening until the shoulder 108 clears an inner side of the backing plate. Also, the fastener 101 preferably includes a cavity or recess (not shown) provided in the end 103 thereof which is filled with grease so as to provide a lubricated sliding surface for the associated web portions and/or table portions of the brake shoes.

Figure 15:
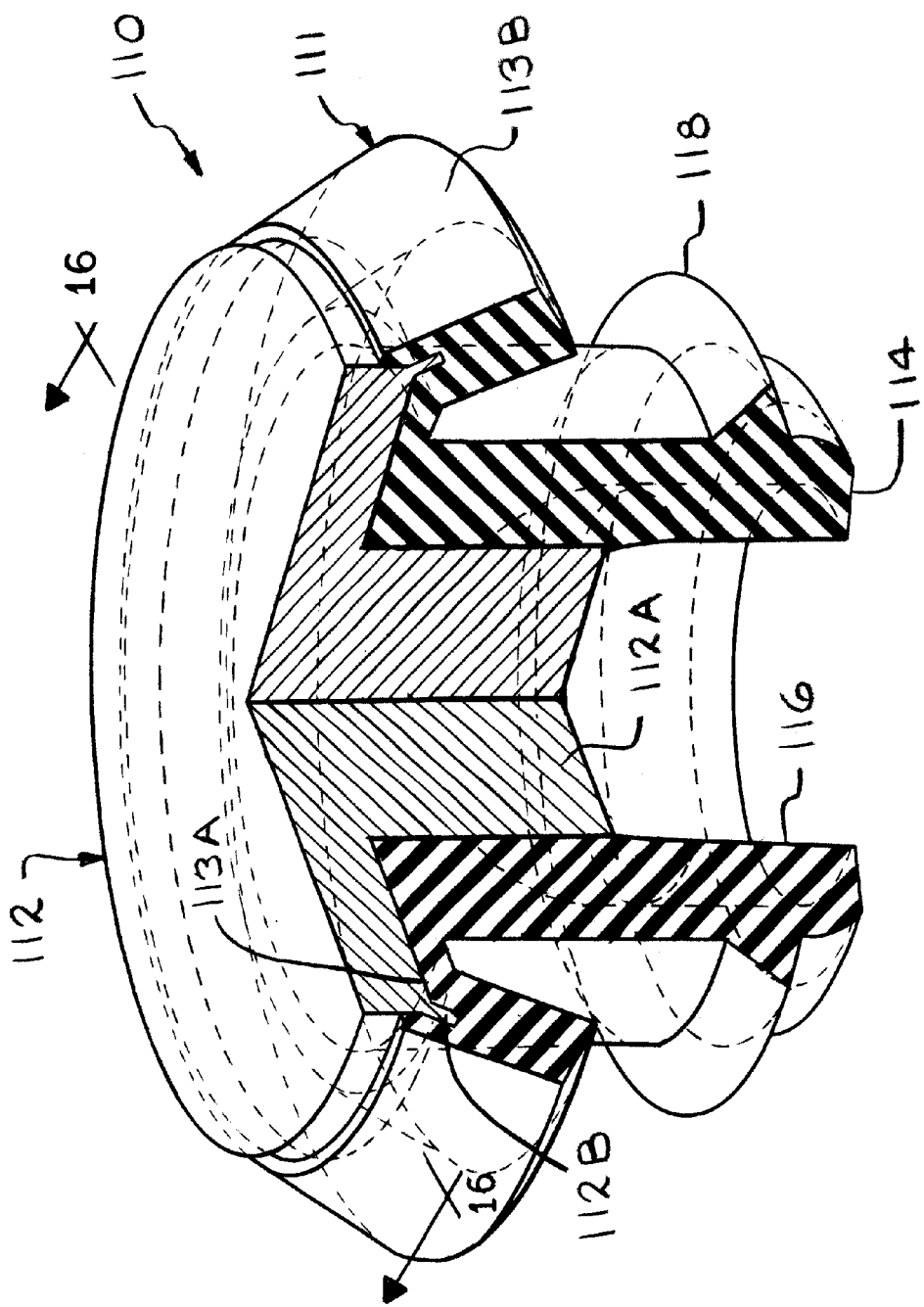
FIG. 15 is a perspective view of a sixth embodiment of a portion of a damped brake shoe support device in accordance with the present invention.
Figure 16:
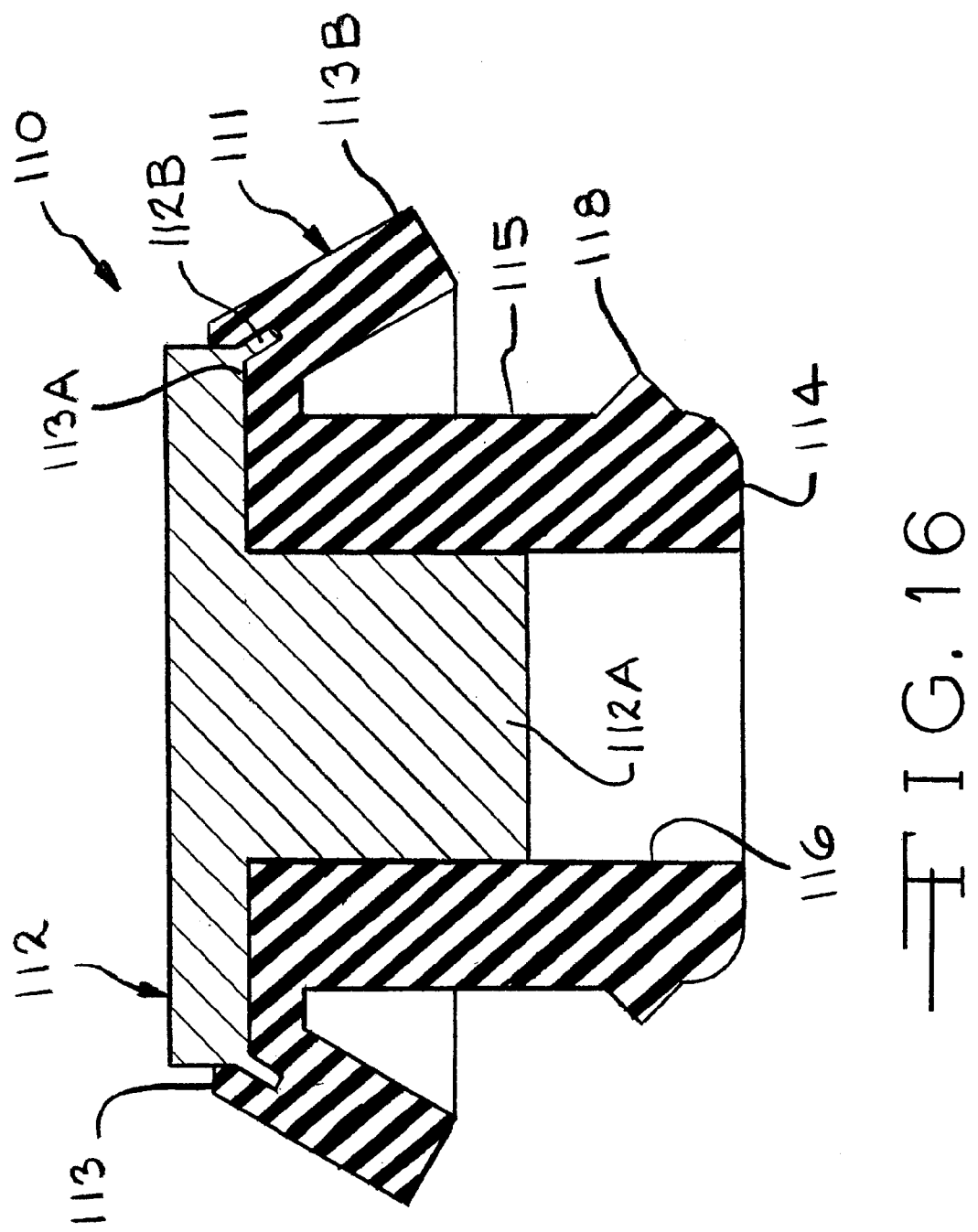
FIG. 16 is a sectional view of the damped brake shoe support device shown in FIG. 15.

Turning now to FIGS. 15 and 16 and using like reference numbers to indicate corresponding parts, the structure of a portion of a fifth embodiment of a damped brake shoe support device, indicated generally at 110, in accordance with the present invention will be discussed. The damped brake shoe support device 110 includes a first member 111 and a second member 112. The first member 111 is a combination fastener and damper, and the second member is sliding surface member. The fastener 100 is adapted to be installed in an opening provided in the backing plate.

The first member 111 includes a first end 113, and an opposed second end 114, and a main body portion 115 extending therebetween. A suitable material for the fastener 101 is an elastomer material. The first end 113 includes a recess 113A and a tapered outwardly flanged portion 113B. The first member 111 further includes a slot 116 formed therein extending from the end 114 toward the end 113, and a raised rib 118 formed thereon. The second member 112 is a generally flat annular member formed from a suitable hard rigid material, such as for example, steel. The second member 112 is preferably secured to the first member 111 during the forming of the first member 111 by a molding process. In order to assist in the retention of the first member 111 to the second member 112 during the molding process, the second member 112 may be provided with one or more tangs or extensions 112B (only one of such tangs being illustrated) and with a center extension 112A. Alternatively, the first member 11 and the second member 112 can be separately formed and the second member 112 attached to the first member 11 by other means. For example, the second member 112 could be simply forced into the recess 113A, or an adhesive could be first deposited in the recess 113A and the second member 112 inserted into therein. When the device 110 is installed in the opening of the backing plate, the flanged portion 113B is preferably free to flex or deform outwardly to allow some "free play" movement in an axial direction relative thereto.

One advantage of the present invention is that damped brake shoe support devices reduce brake noise during braking by vibration damping the transmission of noise from the brake shoe to the backing plate. Another advantage is that the damped brake shoe support devices of the present invention provide a durable sliding surface for the brake shoe web portion and/or brake shoe table portion which is easily used in service. Also, the damped brake shoe support devices of the present invention provide a grease retaining structure for the life of the friction pad lining material.

While the present invention has been described and illustrated as using a specific damped brake shoe support device, other structures can be used in connection with the present invention. For example, the device could use other kinds of fasteners and other kinds of damping material.

Although the invention has been described and illustrated in connection with a particular prior art drum brake assembly 10 disclosed herein, it will be appreciated that this invention may be used in connection with types of drum and drum and disc brake assemblies.

In accordance with the provisions of the patents statues, the principle and mode of operation of this invention have been described and illustrated in its preferred embodiment. However, it must be understood that the invention may be practiced otherwise than as specifically explained and illustrated without departing from the scope or spirit of the attached claims.

What is claimed is:

1. A drum brake assembly adapted to selectively frictionally engage a brake drum comprising:

a backing plate supported relative to a vehicle component, said backing plate having at least one opening formed therethrough;

at least one brake shoe supported on said backing plate for selective movement into frictional engagement with the brake drum, said brake shoe including a brake shoe sliding surface;

a brake mechanism for selectively moving said brake shoe into frictional engagement with the brake drum;

at least one damped brake shoe support device carried by said backing plate, said damped brake shoe support device including a first member and a second member, said first member being formed of a relatively rigid material and including a first end which defines a sliding surface for engagement with an adjacent surface of said brake shoe sliding surface, said second member being formed of a damping material and interposed between said first end of said first member and said backing plate, said damped brake shoe support device being carried by said backing plate for free play relative to said backing plate in at least one of a radial direction and an axial direction relative thereto.

2. The drum brake assembly defined in claim 1 wherein the first member includes an opposed second end which extends at least into said opening of said backing plate to secure said damped brake shoe support device to said backing plate.

3. The drum brake assembly defined in claim 1 wherein said first member is a rivet.

4. The drum brake assembly defined in claim 1 wherein said second end of said first member extends through said opening of said backing plate and includes at least two raised ribs formed on a portion thereof.

5. The drum brake assembly defined in claim 1 wherein said second end of said first member extends through said opening of said backing plate and includes an annular recess formed therein, said damped brake shoe support device further including a fastener disposed in said recess to thereby secure said damped brake shoe support device to said backing plate.

6. The drum brake assembly defined in claim 1 wherein said second end of said first member extends through said opening of said backing plate and includes at a plurality of serrations formed on a portion thereof.

7. The drum brake assembly defined in claim 1 wherein said first member is a two piece member.

8. The drum brake assembly defined in claim 7 wherein said two piece member includes a first piece formed from a first material and a second piece formed from a second material which is different from said first material.

9. The drum brake assembly defined in claim 7 wherein said two piece member includes a first piece formed from an elastomeric material and a second piece formed from a metal.

10. The drum brake assembly defined in claim 9 wherein the metal second piece is integrally molded in situ with said elastomeric first piece.

11. The drum brake assembly defined in claim 1 wherein said damped brake shoe support device is carried by said backing plate for free play relative to said backing plate in said axial direction.

12. The drum brake assembly defined in claim 1 wherein said damped brake shoe support device is carried by said backing plate free play relative to said backing plate in said radial direction.

13. The drum brake assembly defined in claim 1 wherein said damped brake shoe support device is carried by said backing plate free play relative to said backing plate in said radial direction and said axial direction.

14. The drum brake assembly defined in claim 1 wherein said first end of said first member is provided with a pocket adapted to receive a lubricant.

15. The drum brake assembly defined in claim 1 wherein said brake shoe sliding surface is on a web portion of said brake shoe.

16. The drum brake assembly defined in claim 1 wherein said brake shoe sliding surface is on a table portion of said brake shoe.

* * * * *